United States Patent [19]
Miura et al.

[11] Patent Number: 6,012,599
[45] Date of Patent: Jan. 11, 2000

[54] FUEL TANK

[75] Inventors: Natsushi Miura, Aichi-ken; Hiroyuki Hagano, Inazawa; Masayuki Nakagawa, Iwakura, all of Japan

[73] Assignee: Toyoda Gosei Co., Ltd., Aichi-Ken, Japan

[21] Appl. No.: 08/954,054

[22] Filed: Oct. 17, 1997

[30] Foreign Application Priority Data

Oct. 18, 1996 [JP] Japan ................................. 8-297456

[51] Int. Cl.$^7$ .................................................. F16K 17/00
[52] U.S. Cl. ........................ 220/86.2; 141/312; 137/583
[58] Field of Search ........................... 220/86.2; 141/312, 141/286; 137/583, 540, 543.17

[56] References Cited

U.S. PATENT DOCUMENTS

| | | | |
|---|---|---|---|
| 3,698,597 | 10/1972 | Burke | 220/86.2 |
| 4,632,270 | 12/1986 | Sasaki et al. . | |
| 4,974,645 | 12/1990 | Johnson | 220/86.2 |
| 5,190,180 | 3/1993 | Crone | 220/86.2 |
| 5,348,177 | 9/1994 | Sung | 220/86.2 |
| 5,385,179 | 1/1995 | Bates et al. | 220/86.2 |
| 5,638,874 | 6/1997 | Thompson | 220/86.2 |
| 5,749,487 | 5/1998 | Sae, II | 220/86.2 |
| 5,850,851 | 12/1998 | Miura et al. | 137/583 |

*Primary Examiner*—Joseph M. Moy
*Attorney, Agent, or Firm*—Pillsbury Madison & Sutro LLP

[57] ABSTRACT

A check valve 30 set in a fuel tank 10 that dispenses incoming cooler fuel over a wide area that also reduces development of the fuel vapor in a gas tank body 12 when filling the tank. The check valve 30 is attached to one end of an inlet pipe 22 for introducing a supply of fuel into the tank body 12, and includes a housing 32 with a plurality of outlets 38, a valve member 40, and a spring 50. The plurality of outlets 38 are arranged at substantially equal intervals along a circumferential direction of the housing 32. The check valve 30 is generally set in its normally closed position by the pressing force of the spring 50 in order to prevent the fuel vapor in the tank body 12 from being discharged to the atmosphere even without a cap. The flow of fuel presses open the check valve 30 and is discharged out of the plurality of outlets 38 toward a wide area in the tank body 12, so as to cool down the fuel stored in the tank body 12, thereby reducing development of the fuel vapor.

2 Claims, 13 Drawing Sheets

FUEL TANK

BACKGROUND OF THE INVENTION

1. Field of the Invention

The present invention relates to a fuel tank with a check valve attached to a fuel feed pipe fixed to a tank body.

2. Description of Related Art

Generally a check valve is provided in a fuel tank of an automobile to prevent liquid fuel and fuel vapor in the fuel tank from flowing in a reverse direction to be discharged to the atmosphere when filling the fuel tank. FIG. 21 is a partly sectioned, side view illustrating a conventional fuel tank 200 of an automobile that includes a fuel feed mechanism 210 attached to a side wall member 204 of a tank body 202 for feeding fuel into the tank body 202. The fuel feed mechanism 210 includes an inlet pipe 212 fixed to the side wall member 204, an inlet hose 214 connected to an opening of the inlet pipe 212, an inlet filler pipe 216 connected to an opening of the inlet hose 214, and a cap 218 attached to a fuel filler opening 216a of the inlet filler pipe 216. A canister (not shown) is further connected to the tank body 202 and receives the fuel vapor discharged from the tank body 202 when filling the tank.

A check valve 220, attached to an opening 212a of the inlet pipe 212, prevents liquid fuel and fuel vapor in the tank body 202 from flowing in a reverse direction to be discharged to the atmosphere when filling the tank body 202.

FIG. 22 is a perspective view illustrating the appearance of the check valve 220 that includes a support fitting 222 welded to an circumferential surface 212b of the inlet pipe 212, a valve member 226 rotatably attached to the support fitting 222 via a shaft element 224 for closing the opening 212a of the inlet pipe 212, and a coil spring 228 supported by the shaft element 224 for pressing the valve member 226 toward its normally closed position.

When a user removes the cap 218 and feeds a supply of fuel through the fuel filler opening 216a, the flow of fuel presses open the valve member 226 against the pressing force of the coil spring 228 and is fed into the tank body 202. The flow of fuel through the inlet pipe 212 strikes against the valve member 226 of the check valve 220 and falls down to be reserved in the tank body 202. When supplying the fuel into the fuel tank 200 is completed, the check valve 220 closes to prevent the liquid fuel and fuel vapor in the tank body 202 from flowing in a reverse direction and thereby discharging to the atmosphere.

When the temperature is relatively high wherein the saturated vapor pressure is increased, the tank body 202 of the fuel tank 200 fills with the fuel vapor. Accordingly, the supply of fuel into the tank body 202 forces the fuel vapor out of the tank body 202 and increases the volume of the fuel vapor flown into the canister.

SUMMARY OF THE INVENTION

The object of the present invention is thus to provide a fuel tank that can decrease the volume of the fuel vapor discharged from the fuel tank when supplying fuel even when the temperature is relatively high.

At least a part of the above and other related objects are realized by a fuel tank including: a tank body for storing a fuel; a fuel filler pipe connected to the tank body which leads a supply of fuel into the tank body; and a check valve attached to an end of the fuel filler pipe inside the tank body which prevents a liquid fuel and fuel vapor in the tank body from flowing in a reverse direction to be discharged to the atmosphere via the fuel filler pipe, wherein the check valve opens in response to a flow of the fuel into the fuel filler pipe and leads the flow of the fuel into the tank body. The check valve includes: a passage-forming member having a fuel conduit connected to the fuel filler pipe and an outlet that opens into the inside of the tank body, wherein the flow of fuel running through the fuel conduit is to be discharged from the outlet into the tank body; and a valve member for opening and closing one of the fuel conduit and the outlet. The value outlet is arranged to make at least a part of the flow of the fuel relatively outwardly in a variety of directions within the tank, including in an upward direction, so that the direction of the flow of the fuel into the tank is diverse.

In the fuel tank of the present invention, a supply of fuel introduced from the fuel filler pipe flows through the fuel conduit defined by the passage-forming member of the check valve attached to the end of the fuel filler pipe and presses open the valve member to be fed through the outlet into the tank body. The outlet is arranged to make at least a part of the flow of the fuel relatively upward to the direction of the flow of the fuel in the fuel filler pipe when the supply of the fuel is discharged into the tank body. This configuration enables the flow of fuel to be fed into the tank not only at a position immediately below the end of the fuel filler pipe but also there beyond and across a wide area within the tank body.

The temperature of the newly supplied fuel is generally lower than the temperature of the fuel stored in the tank body. The flow of the fuel accordingly cools down a wide area in the tank body and lowers the saturated vapor pressure of the fuel in the tank body, thereby reducing development of the fuel vapor. This structure effectively reduces the volume of the fuel vapor discharged out of the tank body.

It is preferable that the check valve further includes a spring for pressing the valve member toward a closed position. The valve member may be a thin valve plate having elasticity.

In accordance with one preferable structure of the check valve, the passage-forming member is provided with a housing formed in a cup-like shape having a side wall member and a bottom wall member. In this structure, the outlet is formed in the side wall member. The valve member has a cone-shaped element for opening and closing the fuel conduit and leading the flow of the fuel through the fuel conduit to the outlet when the valve member is set in an open position.

When the check valve of this structure is set in the open position, the cone-shaped element of the valve member uniformly leads the flow of fuel through the fuel conduit along the inclined surface thereof to the outlet. It is further preferable that the valve member has a circular seat element that is disposed at a foot of the cone-shaped element and seated on a circumferential face of the fuel conduit to close the fuel conduit. The circular seat element changes the flow of the fuel in a substantially perpendicular direction and ensures an effective spread of the fuel in the tank body.

The outlet is preferably formed to direct the flow of incoming across a wide area in the tank body. One preferable arrangement includes a plurality of outlets at substantially equal intervals along the whole circumference of the housing. A plurality of outlets may be arranged at unequal intervals according to the shape of the tank body, in order to ensure a distribution of the inflowing fuel over a wide area in the tank body.

In the structure having the cup-shaped housing, a connection hole for connecting the housing to the tank body may be formed in the bottom wall. The fuel remaining in the housing is discharged via the connection hole to the tank body. This structure effectively prevents the fuel from remaining in the housing to form tar.

In accordance with another preferable application, the passage-forming member includes a housing connected to the fuel conduit and a support member detachably attached to the passage-forming member. The support member is provided with an in-valve passage having one end connected to the fuel conduit and the other end constructed as the outlet, which has substantially the same area as a sectional area of the fuel conduit, and a guide element disposed in the outlet for supporting the valve member to allow opening and closing movements of the valve member. The valve member has a plate-like valve disc for opening and closing the outlet and changing the flow of the fuel in a substantially perpendicular direction and a stem element disposed on the valve disc and supported by the guide element.

In accordance with still another preferable structure of the check valve, the passage-forming member includes a housing connected to the fuel conduit and a support member detachably attached to the housing. The support member is formed in a cup-like shape and includes a side wall member, a bottom wall member, and a guide element disposed on the bottom wall member. In this structure, the outlet is formed in the side wall member. The valve member has a plate-like valve disc for opening and closing the fuel conduit and leading the flow of the fuel to the outlet and a valve support stem disposed on the valve disc and supported by the guide element.

In accordance with another preferable structure of the check valve, a weight is attached to the passage-forming member in order to enable the passage-forming member to be rotatable relative to the fuel filler pipe and causes a divergent flow, including upwardly directed flow, of the fuel as it is discharged from the outlet. Even when the outlet of the passage-forming member faces downward at the time of the attachment to the fuel filler pipe, the weight rotates the passage-forming member and directs the outlet upward. This structure effectively cools down the fuel stored in the tank body without any positioning means for positioning the passage-forming member relative to the fuel filler pipe.

In accordance with still another preferable structure of the check valve, the valve member is a valve plate integrally formed of a thin elastic plate. The valve plate includes a disc element which opens and closes the outlet and an arm element having one end linked to the disc element and the other end fixed around the outlet of the passage-forming member. The arm element is arranged to support the disc element and set the disc element in an open position when the disc element receives a pressing force.

The valve plate may be punched out of a metal thin plate, and the arm element may be arranged along substantially the whole circumference of the disc element.

In accordance with another preferable structure of the check valve, the passage-forming member includes a housing provided with a valve passage having one end connected to the fuel conduit and the other end constructed as a flow outlet, a bridging element spanned over the flow outlet, an axial aperture formed as part of the bridging element and arranged substantially on the center of the flow outlet, and a valve support member for supporting the valve member. The valve support member has an axial element rotatably fitted in the axial aperture of the housing and the outlet connected to the flow outlet.

In accordance with still another preferable structure of the check valve, the passage-forming member includes a housing with a valve support member, which is arranged substantial at the center of a outlet along the flow of the fuel. The valve member is provided with a valve disc supported by the valve support member for opening and closing the outlet. The spring is arranged to be spaced from the fuel conduit across the valve disc and apply a pressing force to the valve member toward its normally closed position.

In this structure, the spring does not directly face the outlet, but rather the valve disc is interposed between the spring and the outlet. This configuration prevents the spring from being exposed to the flow of fuel and from interfering with the smooth flow of fuel.

These and other objects, features, aspects, and advantages of the present invention will become more apparent from the following detailed description of the preferred embodiments with the accompanying drawings.

DETAILED DESCRIPTION OF THE PREFERRED EXEMPLARY EMBODIMENTS

Figure 1:
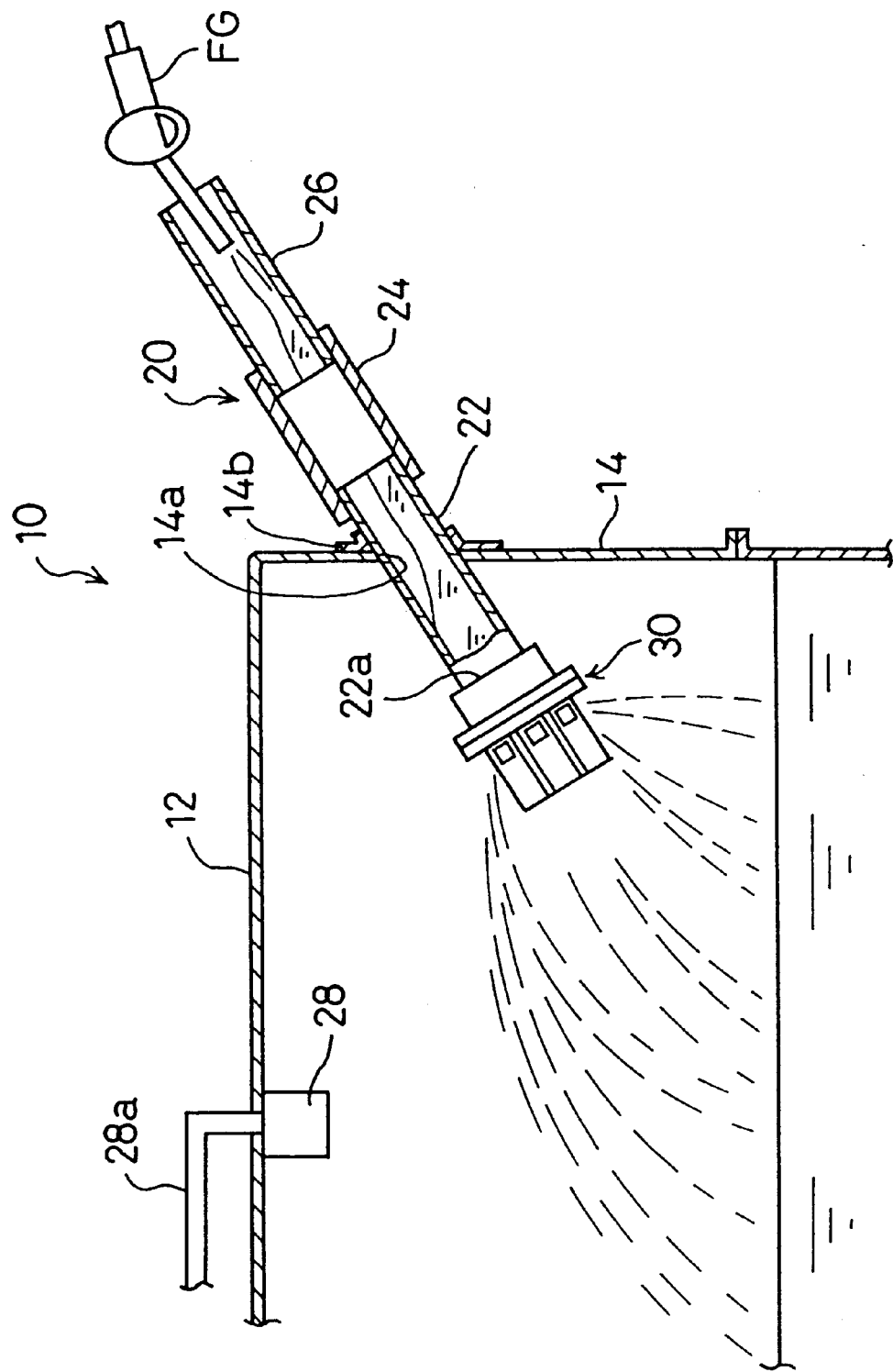
FIG. 1 is a cross-sectional view illustrating a fuel tank embodying the present invention.

FIG. 1 schematically illustrates a fuel tank 10 incorporated in an automobile. The fuel tank 10 includes a fuel feed mechanism 20 attached to a side wall member 14 of a tank body 12 for feeding fuel into the tank body 12. The fuel feed mechanism 20, in the form of a fuel filler pipe, includes an inlet pipe 22, a lower portion of which is welded to the side wall member 14, an inlet filler pipe 26, an interconnecting hose 24 between the inlet pipe 22 and the inlet filler pipe 26, and a cap (not shown) attached to a fuel filler opening of the inlet filler pipe 26.

One end of the inlet pipe 22 is fitted in an opening 14a formed in the side wall member 14 and fixed to the side wall member 14 via a flange 14b. A check valve 30 is attached to a fuel conduit 22a of the inlet pipe 22. The check valve 30 is switched to an open position at the time of feeding fuel and is otherwise set in a normally closed position. A fuel cut-off valve 28 is disposed in an upper portion of the tank body 12. The fuel cut-off valve 28 is connected to a canister (not shown) via a pipe 28a.

When the user removes the cap and places a fuel feed gun FG and into the inlet filler pipe 26, the fuel feed mechanism 20 of the above configuration enables the supply of fuel when flow starts to reach and open the check valve 30 via the inlet hose 24 and the inlet pipe 22. The fuel then flows into the tank body 12. The check valve 30 is normally closed other than when fuel is being added to the tank, so as to prevent both the liquid fuel and the fuel vapor in the tank body 12 from flowing in a reverse direction to be discharged to the atmosphere even without the cap being in place.

Figure 2:
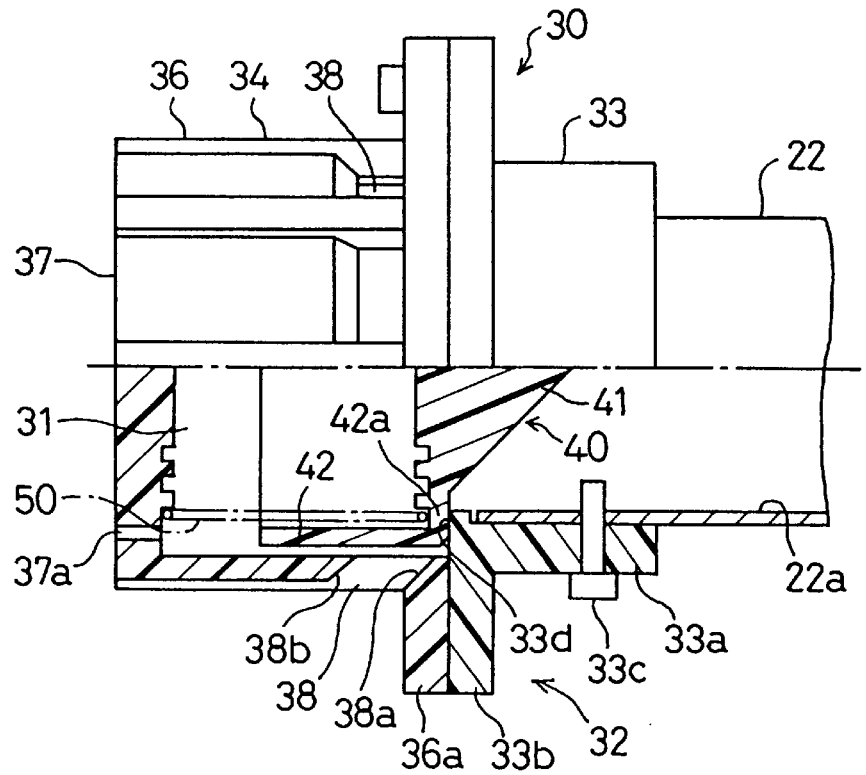
FIG. 2 is a half sectional view illustrating structure of a check valve as a first embodiment according to the present invention.
Figure 3:
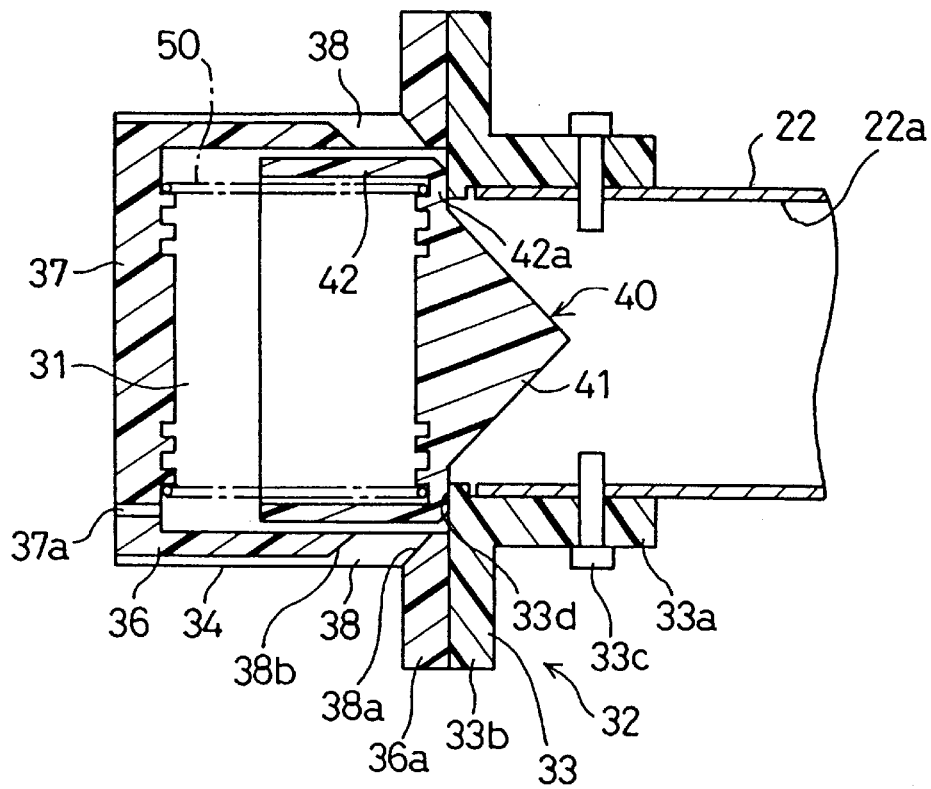
FIG. 3 is a cross-sectional view showing the check valve.

The following describes the structure and operation of the check valve 30. FIG. 2 is a half sectional view showing the check valve 30, and FIG. 3 is a cross-sectional view showing the check valve 30. The check valve 30 includes a housing 32 to define a valve chamber 31 connected to the fuel conduit 22a of the inlet pipe 22, a valve member 40, and a spring 50.

The housing 32 includes a front housing section 33 connected to the inlet pipe 22 and a main housing 34 connected to the front housing section 33. The front housing section 33 includes a tubular element 33a and a front flange element 33b projected from one end of the tubular element 33a, and the tubular element 33a of the front housing section 33 is fixed to the inlet pipe 22 by means of a screw 33c.

The main housing 34, formed in a cup-like shape, includes a side wall member 36 and a bottom wall member 37 with a valve chamber 31 being formed therein. A rear flange element 36a projects from one end of the side wall member 36. The rear flange element 36a joins the front flange element 33b, so that the front housing section 33 and the main housing 34 are integrated with each other to constitute the housing 32.

A plurality of outlets 38 are formed in the side wall member 36 at positions in the vicinity of the rear flange element 36a. In this embodiment, there are preferably eight outlets 38 arranged at equal intervals along the circumferential direction of the main housing 34. Each outlet 38 is formed with an identical shape and preferably have tapered end faces 38a and 38b as shown in FIGS. 2 and 3.

A connection hole 37a connected to the valve chamber 31 is formed in the bottom wall member 37. The connection hole 37a leads the fuel in the valve chamber 31 into the tank body.

The valve member 40 opens and closes the passage between the fuel conduit 22a of the inlet pipe 22 and the outlets 38, so as to lead the fuel flowing through the fuel conduit 22a into the tank body while preventing the fuel vapor in the tank body from leaking to the fuel conduit 22a. The valve member 40 includes a cone-shaped element 41 and a tubular element 42 projected from the circumference of the cone-shaped element 41. The cone-shaped element 41 enables the flow of fuel running through the fuel conduit 22a to substantially equally branch off to the respective outlets 38. A circular seat element 42a is formed at the foot of the cone-shaped element 41. Axial movements of the valve member 40 cause the circular seat element 42a to be seated on or be separated from a seating surface 33d formed on one face of the front flange element 33b. One end of the spring 50 is brought into contact with the rear surface of the cone-shaped element 41 of the valve member 40, whereas the other end of the spring 50 is supported by the bottom wall member 37 of the main housing 34. The valve member 40 accordingly receives a pressing force of the spring 50 toward its normally closed position.

Figure 4:
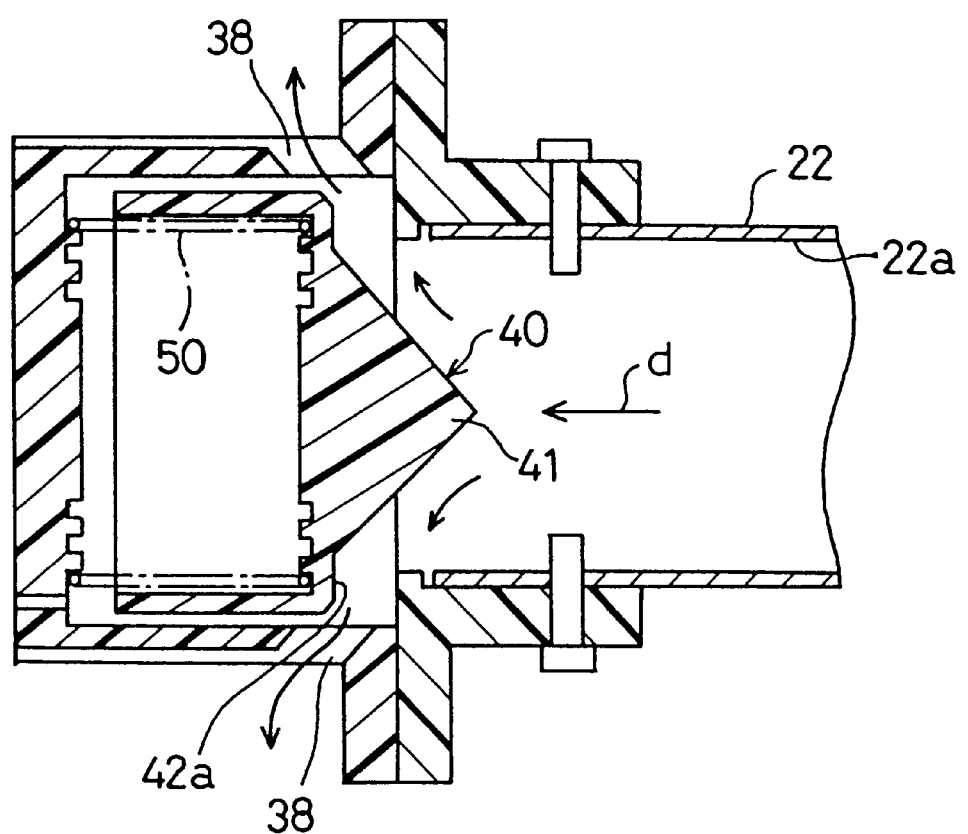
FIG. 4 is a cross-sectional view showing the check valve of the first embodiment in its open position for a supply of fuel.

The check valve 30 thus constructed works in the following manner when feeding fuel. When a supply of fuel flows from the fuel feed gun FG through the fuel filler opening into the inlet filler pipe 26 as shown in FIG. 1, the supply of fuel passes through the inlet hose 24 and the fuel conduit 22a of the inlet pipe 22 and presses open the valve member 40 of the check valve 30 against the pressing force of the spring 50 as shown in FIG. 4. This enables the supply of fuel flowing through the fuel conduit 22a of the inlet pipe 22 to be led into the tank body 12 through the outlets 38. Since there are eight outlets 38 arranged at equal intervals in the circumferential direction of the tank body 12, the flow of fuel discharged from the outlets 38 branches off to many flows directed toward a wide area in the tank body 12 as shown in FIG. 1. In this manner, the supply of fuel is not fed toward a confined part of the liquid surface in the tank body 12 but is discharged over a wide area in the tank body 12.

At gas stations, the fuel is stored in a huge underground reservoir and is supplied to each fuel tank of the automobile from a fuel feed gun FG. The temperature of the fuel stored in the underground reservoir at the gas station is generally lower than the temperature of the fuel stored in the fuel tank 10 of the automobile. Consequently, the cooler fuel supplied from the fuel feed gun FG into the tank body 12 thereby cools down a wide area in the tank body 12. The low-temperature fuel also lowers the saturated vapor pressure of the fuel in the tank body 12 and depresses evolution of the fuel vapor, thereby reducing the fuel vapor flowing into the canister at the time of fuel supply.

As shown in FIG. 4, the circular seat element 42a of the valve member 40 is arranged perpendicular to the direction of the arrow 'd', in which the supply of fuel flows through the fuel conduit 22a of the inlet pipe 22. The flow of fuel is accordingly redirected in a substantially perpendicular direction when striking against the circular seat element 42a. This configuration does not lead the supply of fuel only in the direction of the flow in the fuel conduit 22a but rather enables the flow of fuel to branch off toward the wide area in the tank body.

Figure 5:
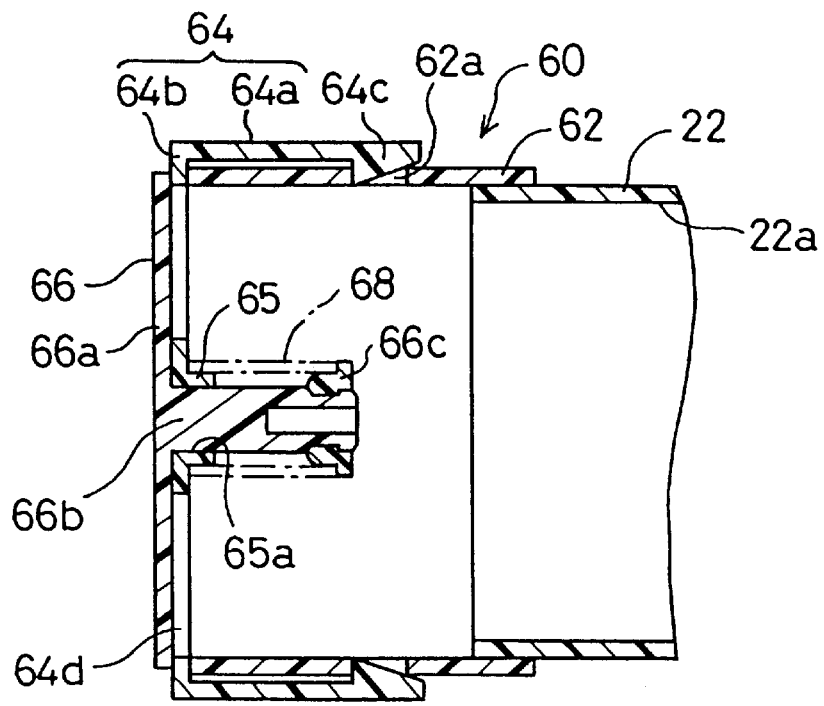
FIG. 5 is a cross-sectional view illustrating structure of another check valve as a second embodiment according to the present invention.
Figure 6:
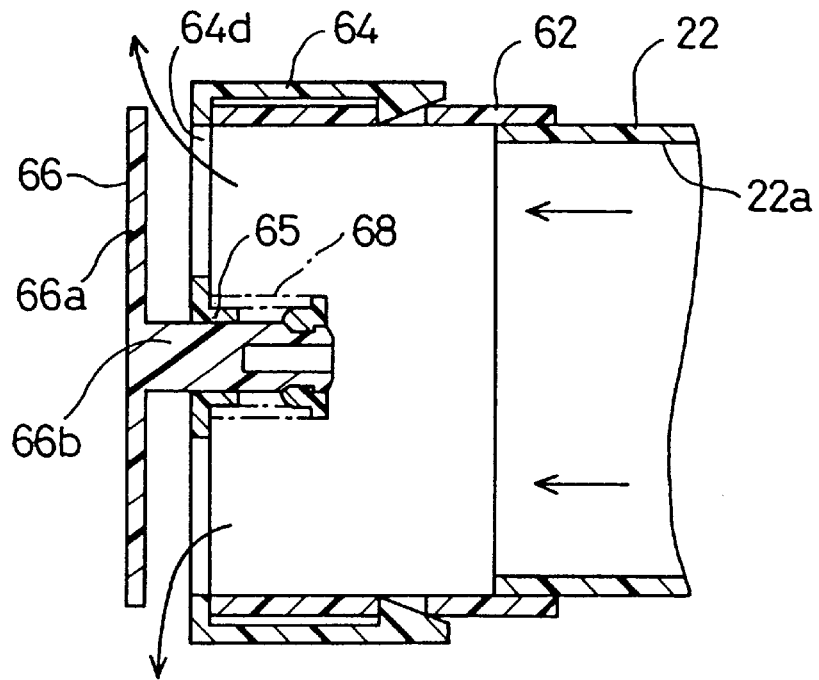
FIG. 6 is a cross-sectional view showing the check valve of the second embodiment in its open position for a supply of fuel.

FIG. 5 is a cross-sectional view illustrating structure of another check valve 60 as a second embodiment according to the present invention, and FIG. 6 is a cross-sectional view showing the check valve 60 of the second embodiment in its open position. As shown in FIG. 5, the check valve 60 includes a housing 62 connected to the inlet pipe 22, a support member 64 attached to the housing 62, a valve member 66 having a valve disc 66a, and spring 68.

The support member 64 for supporting the valve member 66 includes a side wall member 64a and a bottom wall member 64b. A claw 64c, which projects from the side wall member 64a, is fitted into an engagement groove 62a formed in the circumferential surface of the housing 62, so that the support member 64 is fixed to the housing 62. An outlet 64d, for discharging the flow of fuel into the tank body 12, is formed in the bottom wall member 64b. A guide element 65 for supporting the valve member 66 is disposed on the center of the outlet 64d. The guide element 65 has a guide aperture 65a for slidably supporting a stem element 66b of the valve member 66.

The guide element 65 of the support member 64 holds one end of the spring 68, and the other end of the spring 68 is supported by a spring stop 66c fixed to an end of the stem element 66b. The valve member 66 receives a pressing force of the spring 68 toward its normally closed position.

As shown in FIG. 6, when the flow of fuel reaches the valve member 66, the valve member 66 opens against the pressing force of the spring 68 and enables the flow of fuel to be fed through the outlet 64d into the tank body. In the check valve 60, the outlet 64d opens over the whole area at the end of the housing 62. This configuration enables the flow of fuel discharged from the outlet 64d to branch off to many flows toward a wide area in the tank body and cool down the fuel stored in the tank body 12, thereby effectively reducing development of the fuel vapor.

Figure 7:
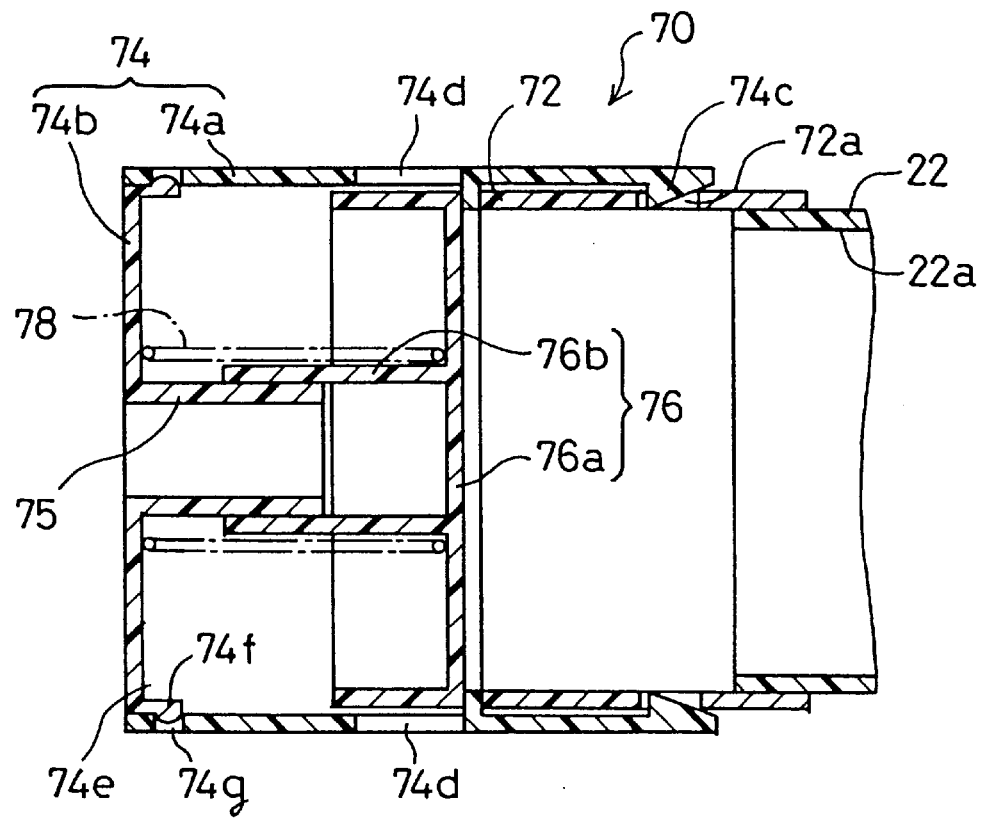
FIG. 7 is a cross-sectional view illustrating structure of still another check valve as a third embodiment according to the present invention.
Figure 8:
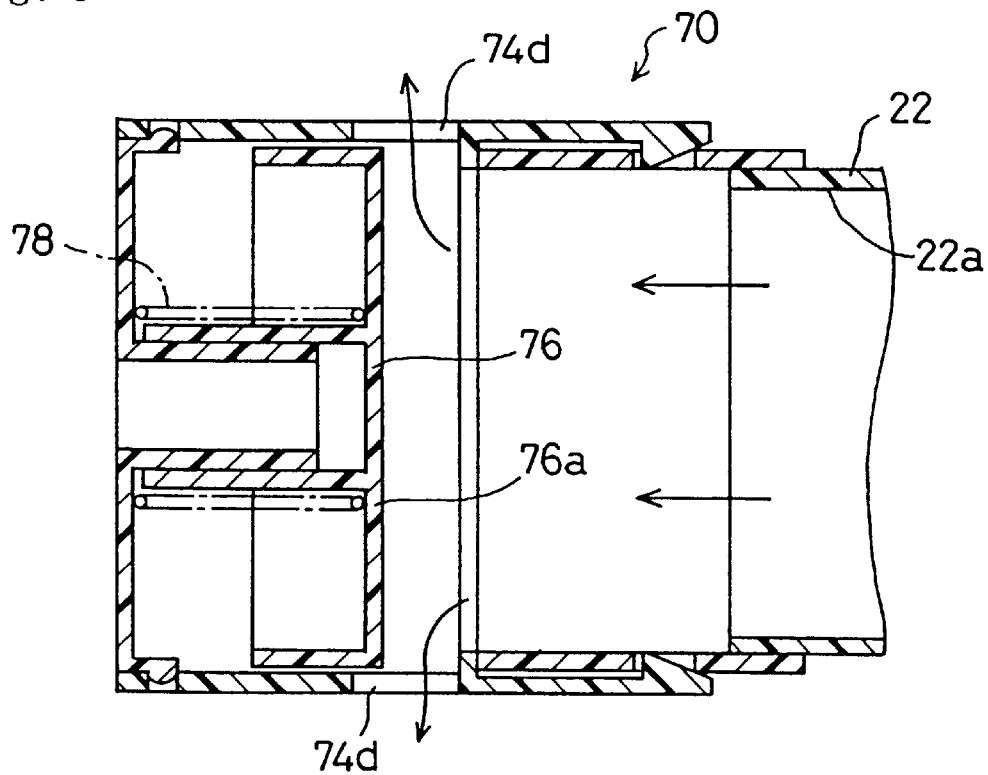
FIG. 8 is a cross-sectional view showing the check valve of the third embodiment in its open position for a supply of fuel.

FIG. 7 is a cross-sectional view illustrating structure of still another check valve 70 as a third embodiment according to the present invention, and FIG. 8 is a cross-sectional view showing the check valve 70 of the third embodiment in its open position. Referring to FIG. 7, the check valve 70 includes a housing 72 connected to the inlet pipe 22, a support member 74 attached to the housing 72, a valve member 76, and a spring 78.

The support member 74 for supporting the valve member 76 includes a side wall member 74a and a bottom wall member 74b. A claw 74c, which projects from the side wall member 74a, is fitted into an engagement groove 72a formed in the circumferential surface of the housing 72, so that the support member 74 is fixed to the housing 72. A plurality of outlets 74d are formed in an end portion of the side wall member 74a close to the inlet pipe 22. Like the structure of the first embodiment shown in FIGS. 2 and 3, there are preferably eight outlets 74d arranged at equal intervals in the circumferential direction of the support member 74. The bottom wall member 74b closes an opening 74e of the side wall member 74a. A pawl 74f, which projects from the bottom wall member 74b, is fitted into an engagement groove 74g formed in the side wall member 74a. A guide element 75, for supporting the valve member 76, projects inwardly from the bottom wall member 74b and is disposed substantially at the center of the circumference of the side wall member 74a.

The valve member 76 includes a plate-like valve disc 76a and a valve support stem 76b held by the guide element 75. Spring 78 spans between the rear surface of the valve disc 76a and the bottom wall member 74b and presses the valve member 76 toward its normally closed position.

As shown in FIG. 8, when the flow of fuel reaches the valve member 76, the valve member 76 opens against the pressing force of the spring 78 and enables the flow of fuel to be fed through the outlets 74d into the tank body 12. In the check valve 70, since the outlets 74d are arranged along the circumference of the support member 74, this configuration enables the fuel to be distributed to a wide area in the tank body 12. In this structure, the valve disc 76a of the valve member 76 is arranged perpendicular to the flow of the fuel in the inlet pipe 22 and radially directs all the flows of fuel toward the outlets 74d arranged in a circumferential direction of the support member 74. This structure can spread the flow of fuel over a wide area and is thus especially preferable when the tank body 12 has a large volume.

Figure 9:
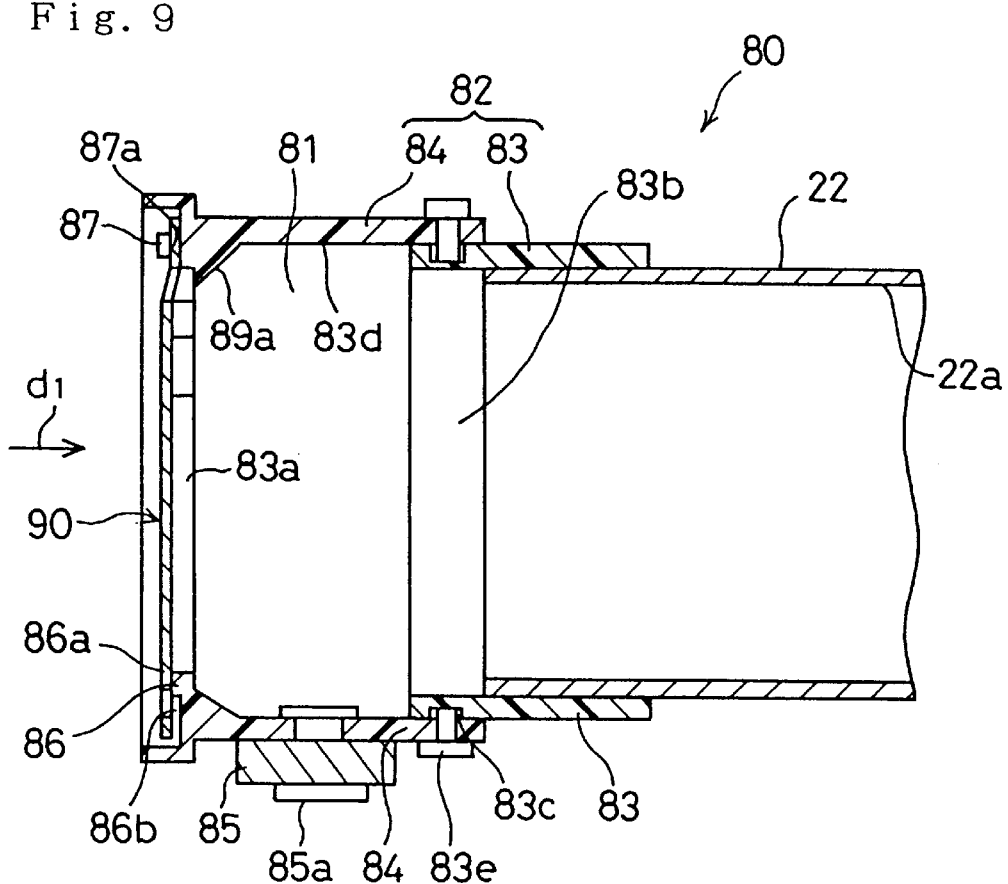
FIG. 9 is a cross-sectional view illustrating structure of another check valve as a fourth embodiment according to the present invention.
Figure 10:
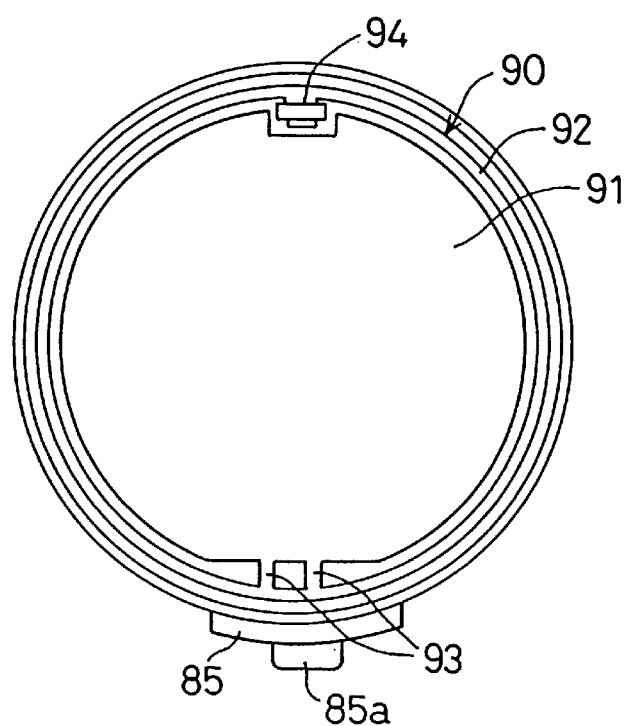
FIG. 10 is a front view showing the check valve of FIG. 9 seen from the direction of an arrow d1.
Figure 11:
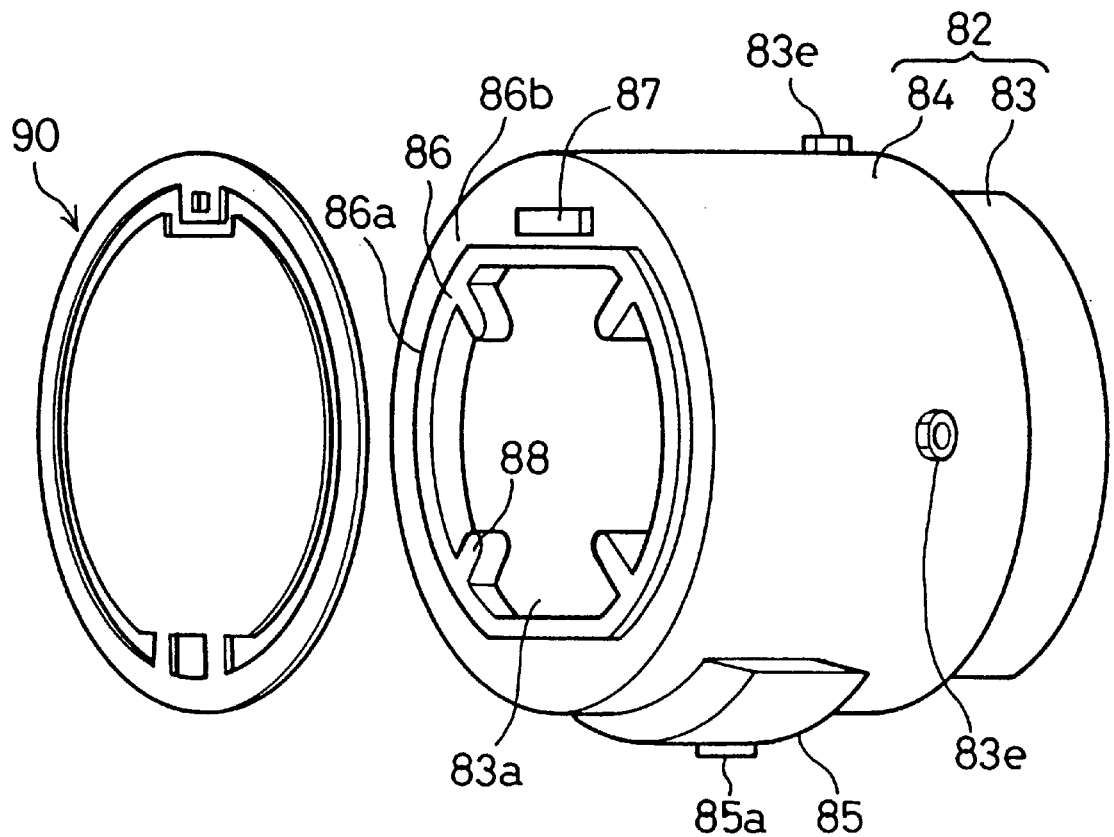
FIG. 11 is a perspective view illustrating the check valve after removal of a valve plate.

FIG. 9 is a cross-sectional view illustrating structure of another check valve 80 as a fourth embodiment according to the present invention. FIG. 10 is a front view showing the check valve 80 of FIG. 9 seen from the direction of an arrow d1, and FIG. 11 is a partly decomposed, perspective view illustrating the check valve 80. As shown in FIG. 9, the check valve 80 directs the flow of the fuel in divergent paths, including in an upward direction, irrespective of the angle of attachment of the check valve 80 to the inlet pipe 22. The check valve 80 includes a housing 82 and a valve plate 90 attached to one end of the housing 82 for opening and closing a flow outlet 83a.

The housing 82 includes a connection pipe 83 fixed to the inlet pipe 22 and a main body 84 rotatably supported by the connection pipe 83. One end of the main body 84 close to the inlet pipe 22 forms a flow inlet 83b, whereas the other end of the main body 84 forms the flow outlet 83a.

A guide groove 83c of a predetermined width is formed in the circumferential surface of the connection pipe 83. The end of a screw 83e passing through an end portion of the main body 84 is inserted into the guide groove 83c. A weight 85 is attached to the outer wall of the main body 84 by means of a screw 85a. The gravity pulls the weight 85 rotating the main body 84, thereby locating the weight toward the ground.

In FIG. 11, a stepped seat 86, on which the valve plate 90 is seated on or from which the valve plate 90 is separated, is formed along the circumference of the flow outlet 83a of the main body 84. The stepped seat 86 includes an upper seating surface 86a and a circumferential surface 86b. A valve support projection 87 for fixing the valve plate 90 projects from the circumferential surface 86b. As shown in the cross-sectional view of FIG. 12, the valve support projection 87 has a notch 87a. Attachment of the valve plate 90 to the housing 82 will be discussed later.

Four support projections 88, each of which projects from the stepped seat 86, are arranged radially toward the center of the circumference of the flow outlet 83a of the housing 82. The support projections 88 prevent the valve plate 90 from entering a fuel conduit 81 defined by the housing 82. As shown in FIG. 9, the housing 82 has a tapered surface 89a near the flow outlet 83a. The tapered surface 89a connects an inner wall surface 83d of the housing 82 to the flow outlet 83a, so as to make a continuous passage of the fuel conduit 81.

Figure 13:
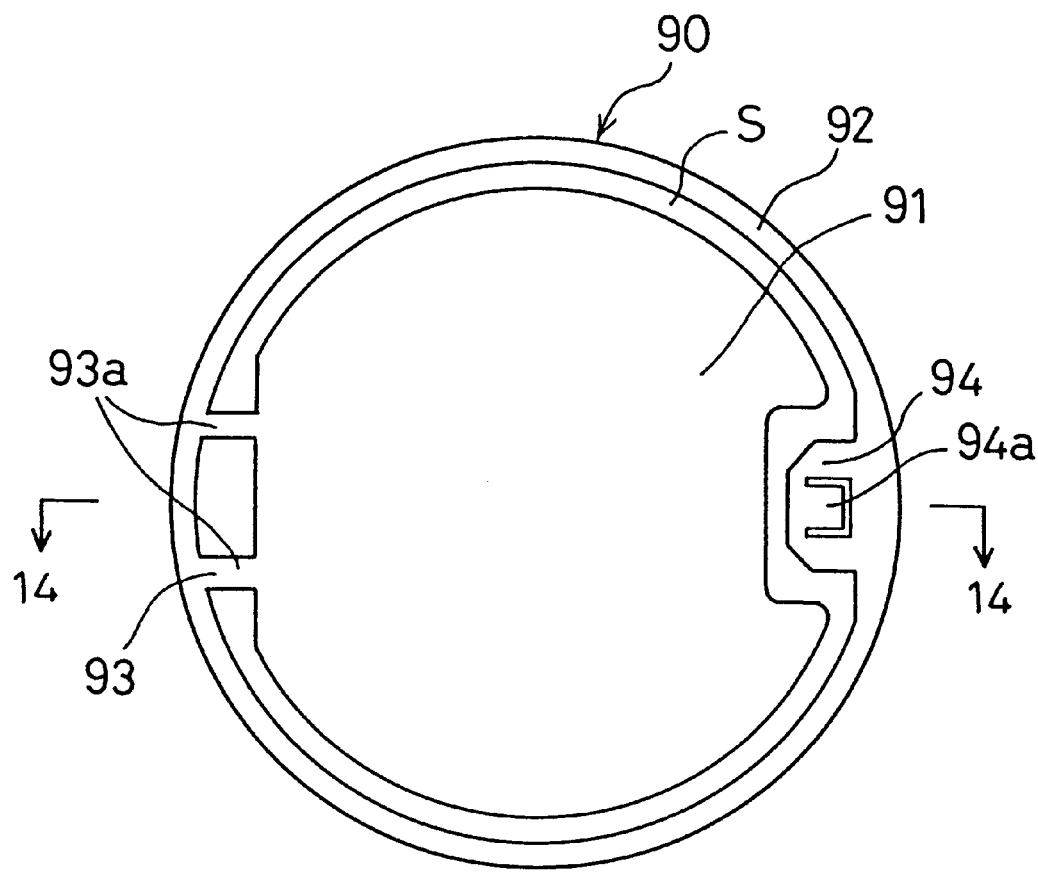
FIG. 13 is a plan view showing the valve plate.
Figure 14:
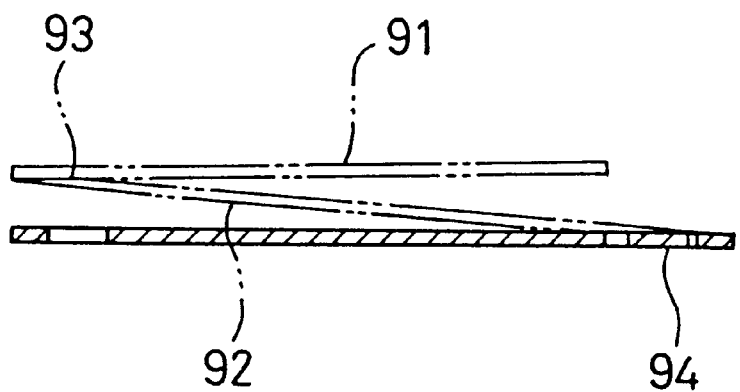
FIG. 14 is a cross-sectional view taken on the line of 14—14 of FIG. 13.

The following describes the structure of the valve plate 90. FIG. 13 is a plan view showing the valve plate 90, and FIG. 14 is a cross-sectional view taken on the line of 14—14 of FIG. 13. The valve plate 90 is formed by punching out a thin plate and is constructed as an integral leaf spring which includes a disc element 91, an arm element 92, a connection element 93, and a fixation element 94. The disc element 91 has a substantially identical shape as the contour of the stepped seat 86 shown in FIG. 11. The disc element 91 either is seated on or separated from the seating surface 86a of the stepped seat 86 so as to open and close the flow outlet 83a of the housing 82.

The circular arm element 92 is arranged a predetermined distance S apart from the circumference of the disc element 91 to come into contact with the circumferential surface 86b of the stepped seat 86 shown in FIG. 13. The arm element 92 is linked with the disc element 91 via the connection element 93. The connection element 93 includes two bridges 93a arranged parallel to each other. The fixation element 94 is formed on the arm element 92 opposite to the connection element 93. The fixation element 94 is held by the valve support projection 87 of the housing 82.

Figure 12:
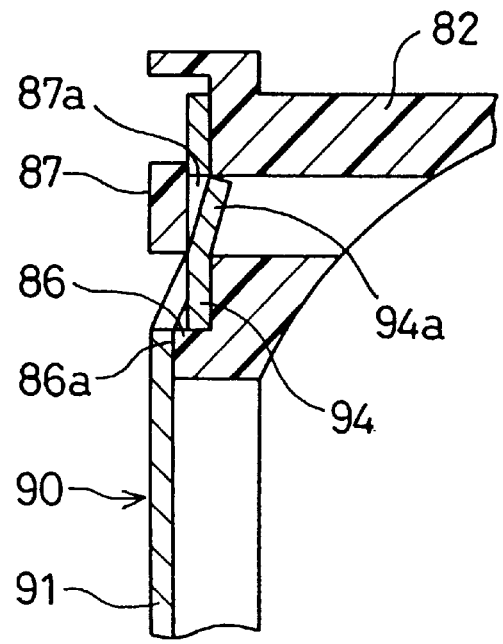
FIG. 12 is a cross-sectional view showing a structure of attaching the valve plate to a housing.

FIG. 12 is an enlarged cross-sectional view showing the fixation element 94 of the valve plate 90 of FIG. 10. When the fixation element 94 of the valve plate 90 is inserted into the notch 87a formed in the valve support projection 87 of the housing 82, a click 94a is pulled up to securely fix the valve plate 90 to the housing 82.

Figure 15:
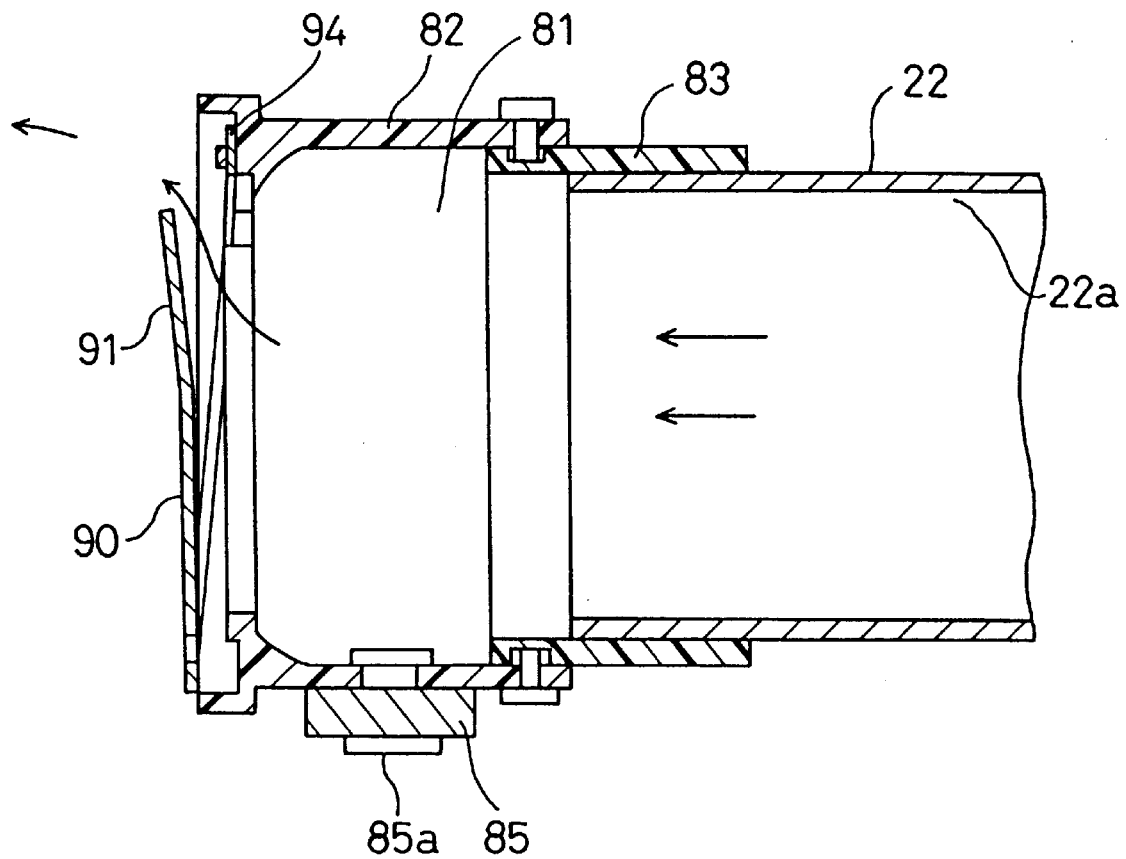
FIG. 15 is a cross-sectional view showing the check valve of the fourth embodiment in its open position for a supply of fuel.

The check valve 80 thus constructed works in the following manner when feeding fuel. The supply of fuel led into the housing 82 through the flow inlet 83b flows through the fuel conduit 81 and reaches the flow outlet 83a, where the flow of fuel presses the disc element 91 of the valve plate 90. Since the valve plate 90 is fixed to the housing 82 via the fixation element 94, the disc element 91 pressed by the flow of fuel opens against the stationary fixation element 94 as shown in FIG. 15. When the flow of fuel presses the disc element 91, the disc element 91 applies an inclining force to the arm element 92 via the connection element 93, so as to form an opening between the flow outlet 83a and the disc element 91. The fuel flows out of this opening.

The disc element 91 of the valve plate 90 is connected with the fixation element 94 via the connection element 93 and the arm element 92 and makes the arm element 92 inclined to form an opening substantially parallel to the flow outlet 83a. Thus fuel flows through the flow outlet 83a and out of a relatively large opening.

In the check valve 80, the weight 85 is attached to the outer wall of the main body 84 as mentioned above. The weight 85 causes the main body 84 to rotate relative to the connection pipe 83 and directs the flow of fuel in an upward direction when the valve plate 90 is opened. This configuration enables the flow of fuel to be discharged in a fixed upward direction, irrespective of the position of the attachment of the check valve 80 to the inlet pipe 22. The upward flow enables the fuel to be distributed over a wide area in the tank body 12 and ensures a highly effective cooling of the fuel stored in the tank body 12, thereby effectively reducing development of the fuel vapor.

Figure 16:
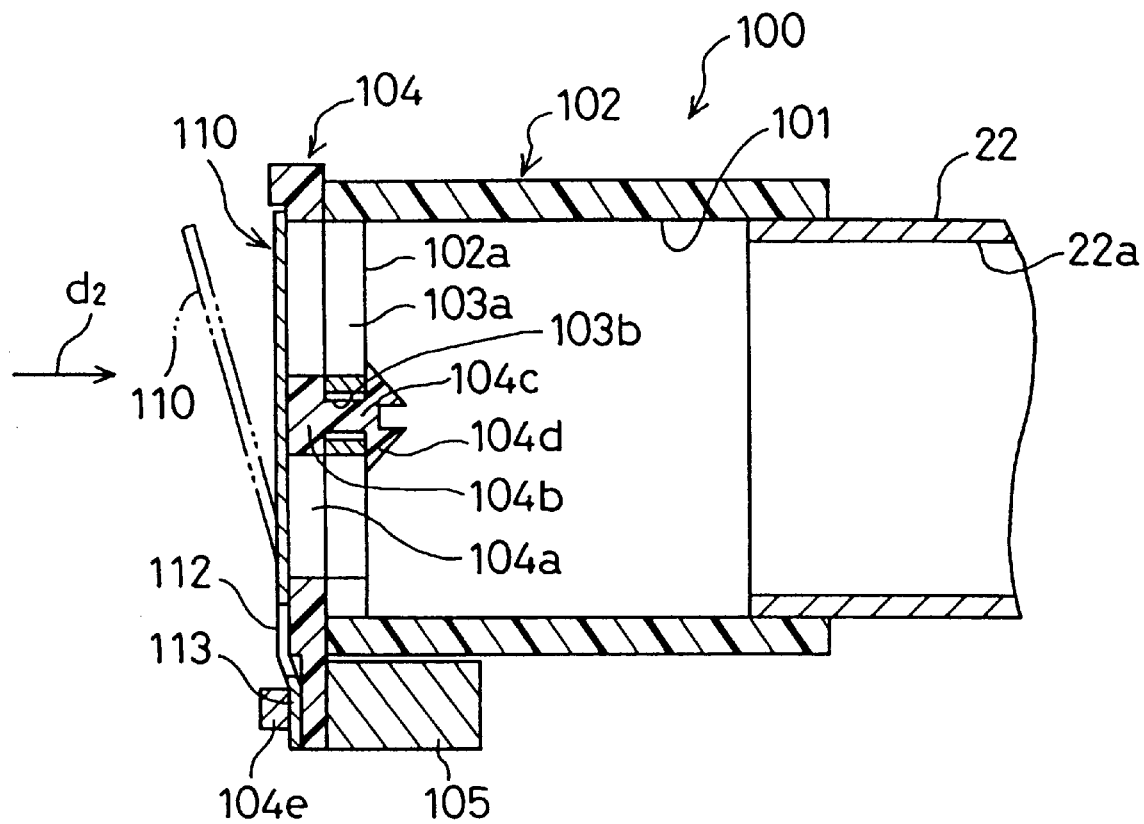
FIG. 16 is a cross-sectional view illustrating structure of still another check valve as a fifth embodiment according to the present invention.
Figure 17:
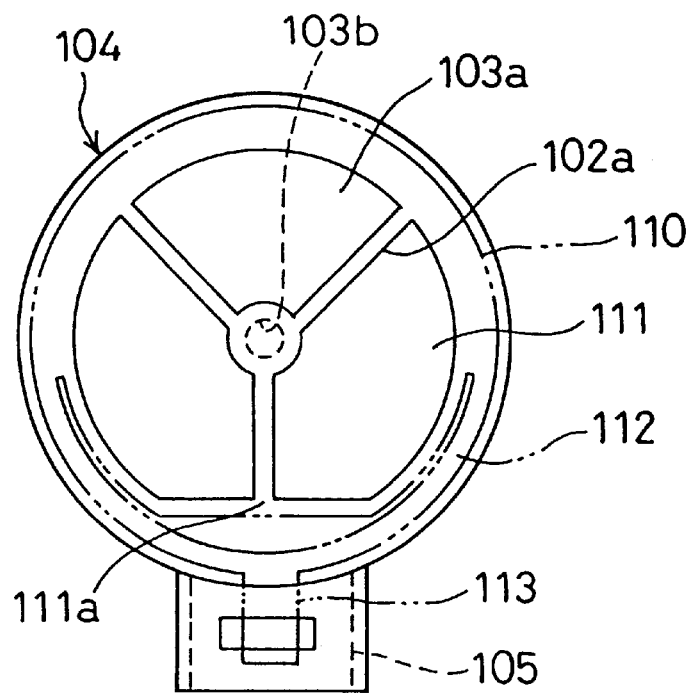
FIG. 17 is a front view showing the check valve of FIG. 16 seen from the direction of an arrow d2.

FIG. 16 is a cross-sectional view illustrating structure of still another check valve 100 as a fifth embodiment according to the present invention, and FIG. 17 is a front view showing the check valve 100 of FIG. 16 seen from the direction of an arrow d2. The check valve 100 includes a housing 102 for defining a valve passage 101, a valve support member 104, and a valve plate 110. The housing 102 has a flow outlet 103a on the downstream side of the valve passage 101 and a bridging element 102a which spans over the flow outlet 103a. An axial aperture 103b for holding the valve support member 104 is formed at the center of the circumference of the bridging element 102a.

The valve support member 104 has a bridging element 104a and a boss element 104b formed on the center of the bridging element 104a. The boss element 104b is provided with an axial element 104c and a slip-off protection 104d formed on one end of the axial element 104c. The axial element 104c of the boss element 104b is fitted into the axial aperture 103b and the slip-off protection 104d secures the fitting, so that the valve support member 104 is attached to the housing 102 in such a manner that the valve support member 104 can rotate relative to the housing 102. A weight 105 is attached to a circumferential surface of the valve support member 104. The gravity rotates the valve support member 104 around the axial element 104c and locates the weight 105 on the lower side of the valve support member 104 toward the ground.

A valve fixation element 104e for supporting the valve plate 110 is formed on the lower portion of the valve support member 104. A fixation element 113 of the valve plate 110 is pressed into a notch of the valve fixation element 104e, so that the valve plate 110 is fixed to the valve support member 104. The valve plate 110 is constructed as an integral leaf spring that includes a disc element 111, an arm element 112, and the fixation element 113. When the disc element 111 of the valve plate 110 receives a force in the opening direction, the disc element 111 moves to form an opening as shown by the two-dot chain line in FIG. 16 while a support element 1 la of the disc element 111 is held by the bridging element 104a.

In the check valve 100, the weight 105 is attached to a circumferential surface of the valve support member 104 as mentioned above. The weight 105 causes the valve support member 104 to rotate relative to housing 102 and directs the flow of fuel upward in the open position of the valve plate 110.

Figure 18:
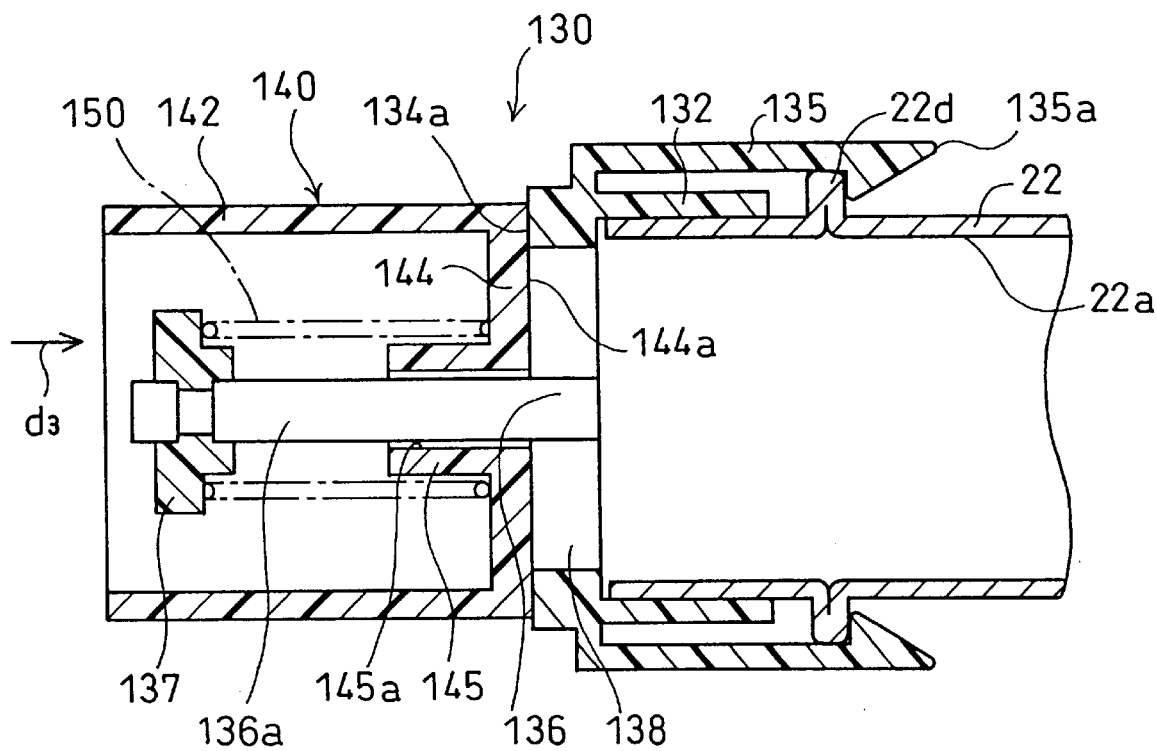
FIG. 18 is a cross-sectional view illustrating structure of another check valve as a sixth embodiment according to the present invention.
Figure 19:
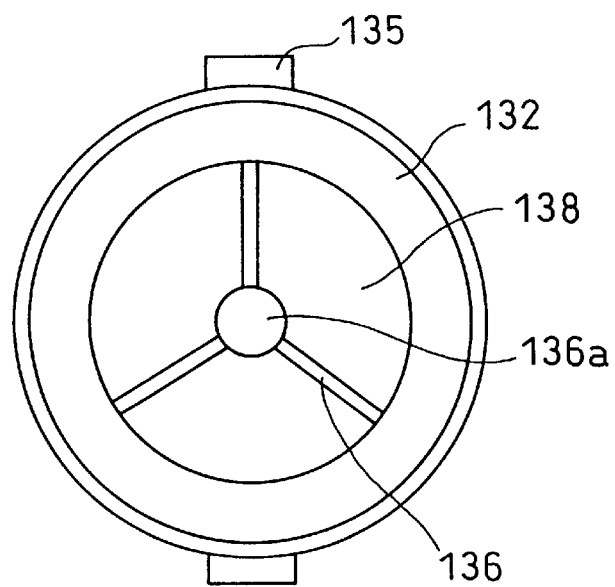
FIG. 19 is a front view showing the check valve of FIG. 18 seen from the direction of an arrow d3.

FIG. 18 is a cross-sectional view illustrating structure of another check valve 130 as a sixth embodiment according to the present invention, and FIG. 19 is a front view showing the check valve 130 of FIG. 18 seen from the direction of an arrow d3. As shown in FIG. 18, the check valve 130 includes a housing 132 connected to the inlet pipe 22, a valve member 140 attached to the housing 132, and a spring 150.

A fitting element 135 is formed around the housing 132. A claw 135a formed on a free end of the fitting element 135 engages with a circular projection 22d formed on the inlet pipe 22, so that the housing 132 is fixed to the inlet pipe 22. An outlet 138 formed on one end of the housing 132 is constructed as an opening that enables a flow of fuel running through the fuel conduit 22a to be discharged into the tank body. A bridging element 136 spans over the outlet 138 as shown in FIG. 19. A valve support member 136a is arranged substantially at the center of the bridging element 136, and a spring support member 137 for supporting the spring 150 is attached to the valve support member 136a.

The valve member 140, formed in a cup-like shape, includes a tubular side wall member 142 and a valve disc 144 disposed on one end of the side wall member 142. The circumferential surface of the valve member 140 forms a seat element 144a which is seated on or separated from a seating surface 134a of the housing 132. A valve support element 145 with a valve supporting aperture 145a projects from the valve disc 144 of the valve member 140. The valve support member 136a is slidably fitted into the valve supporting aperture 145a, so that the valve member 140 is fixed to the housing 132. The spring 150 spans between the bottom surface of the valve member 140 and the spring support member 137. The spring 150 is supported by the spring support member 137 and presses the valve member 140 toward its normally closed position.

Figure 20:
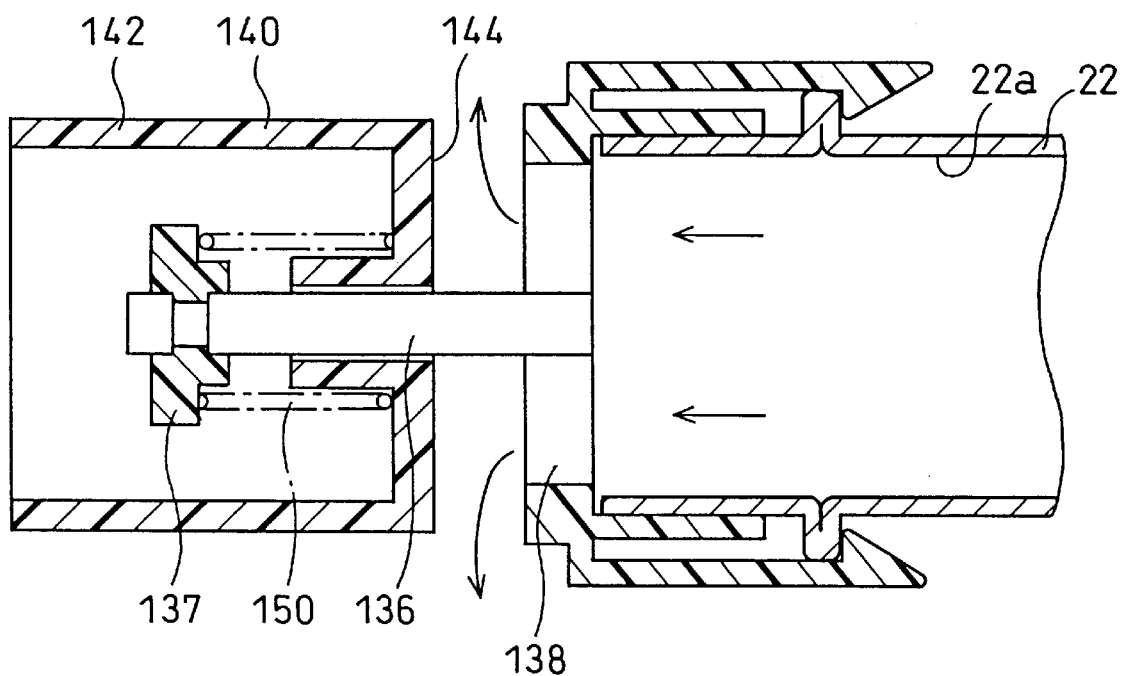
FIG. 20 is a cross-sectional view showing the check valve of the sixth embodiment in its open position for a supply of fuel.
Figure 21:
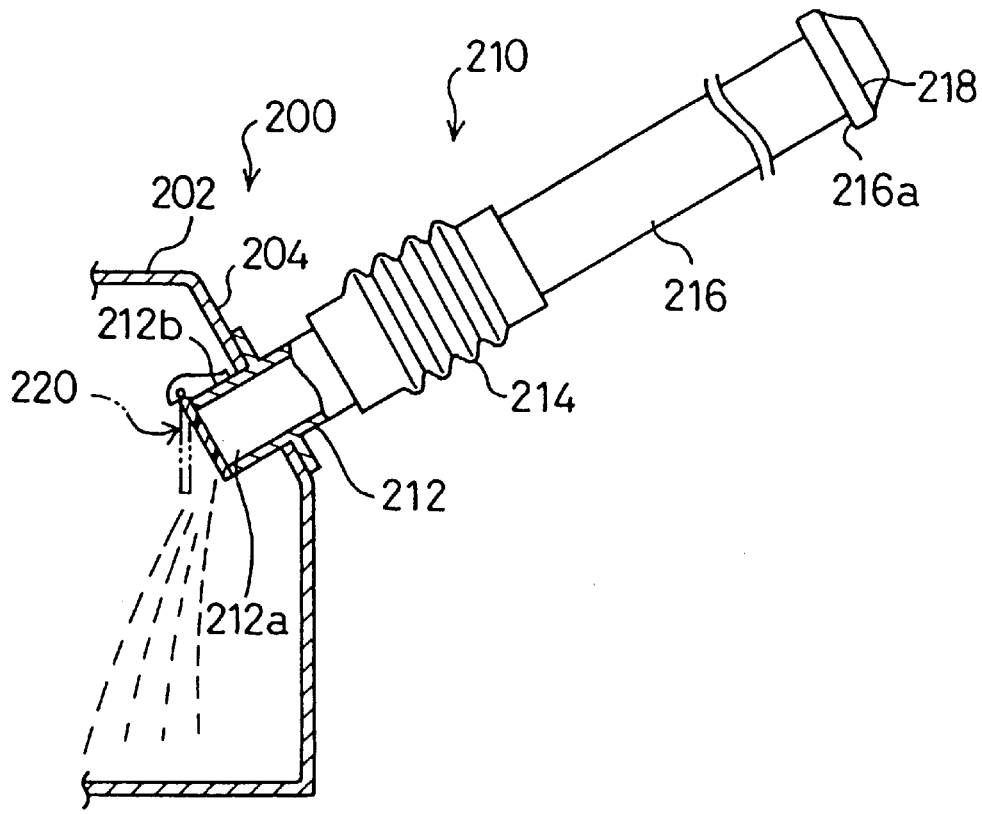
FIG. 21 is a partly sectioned, side view showing a conventional fuel tank.
Figure 22:
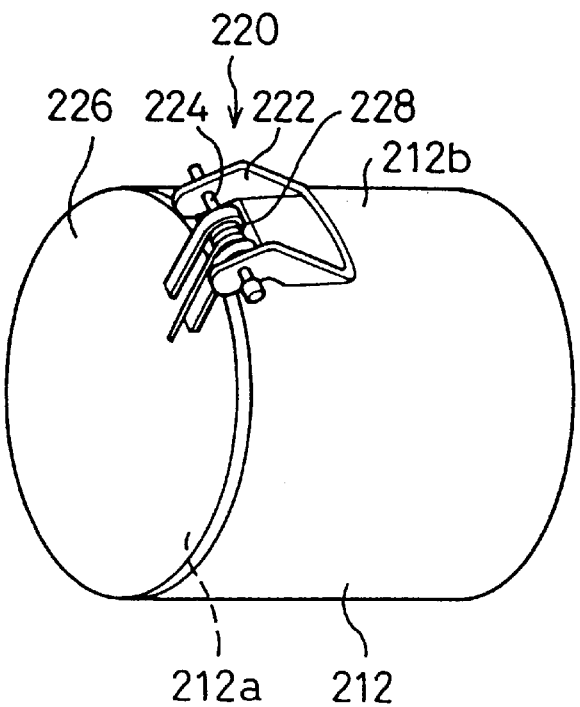
FIG. 22 is a perspective view illustrating the appearance of a conventional check valve.

When the supply of fuel reaches the valve member 140, the valve member 140 opens against the pressing force of the spring 150, so as to lead the flow of the fuel through the outlet 138 into the tank body 12 as shown in FIG. 20. In the check valve 130, the outlet 138 opens over the whole area at the end of the housing 132. This configuration enables the flow of the fuel discharged from the outlet 138 to branch off to many divergent flows toward a wide area in the tank body 12, effectively cooling down the fuel stored in the tank body 12, which reduces development of the fuel vapor.

The spring 150 for pressing the valve member 140 does not directly face the outlet 138, but the valve disc 144 is interposed between the spring 150 and the outlet 138. This configuration prevents the spring 150 from being exposed to the flow of fuel and from interfering with a smooth flow of fuel.

The present invention is not restricted to the above embodiments, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A fuel tank comprising:

a tank body;

a fuel filler pipe constructed and arranged to provide a fuel supply passageway into said tank body, an end of said fuel filler pipe being located inside said tank body; and a check valve attached to said end of said fuel filler pipe and capable of preventing liquid fuel and fuel vapor in said tank body from flowing up said fuel filler pipe, said check valve being operable to open in response to fuel flowing into said fuel filler pipe and to direct fuel into said tank body, wherein said check valve comprises:

an outlet constructed and arranged to disperse at least a part of said flowing fuel outwardly in a variety of directions into said tank body, said outlet being arranged to cause at least part of said flowing fuel to travel upward in a direction substantially opposite to the direction of flow of fuel in said fuel filler pipe when fuel is supplied into said tank body;

a valve member biased in its normally-closed position, said valve member constructed and arranged to allow said outlet to disperse said flowing fuel into said tank body in its open position, said valve member further comprising a plate-like valve disc constructed and arranged to open said outlet and redirect said flowing fuel and a stem element disposed on said valve disc and supported by said guide element;

a passage forming member comprising a fuel conduit connected to said fuel filler pipe and said outlet; and a support member detachably attached to said passage-forming member, said support member having an in-valve passage having a first end connected to said fuel conduit and a second end constructed so as to define said outlet, said outlet having an area substantially the same as a sectional area of said fuel conduit, and a guide element constructed and arranged to support said valve member to allow opening and closing movements of said valve member.

2. A fuel tank comprising:

a tank body;

a fuel filler pipe constructed and arranged to provide a fuel supply passageway into said tank body, an end of said fuel filler pipe being located inside said tank body; and a check valve attached to said end of said fuel filler pipe and capable of preventing liquid fuel and fuel vapor in said tank body from flowing up said fuel filler pipe, said check valve being operable to open in response to fuel flowing into said fuel filler pipe and to direct fuel into said tank body, wherein said check valve comprises:

an outlet constructed and arranged to disperse at least a part of said flowing fuel outwardly in a variety of directions into said tank body, said outlet being arranged to cause at least part of said flowing fuel to travel upward in a direction substantially opposite to the direction of flow of fuel in said fuel filler pipe when fuel is supplied into said tank body;

a valve member biased in its normally-closed position by a spring, said valve member constructed and arranged to allow said outlet to disperse said flowing fuel into said tank body in its open position, said valve member further comprising a valve disc supported by said valve support member constructed and arranged to open said outlet, and said spring being spaced from said fuel conduit across said valve disc;

a passage forming member comprising a fuel conduit connected to said fuel filler piper and said outlet and a housing with a valve support member, which is arranged substantially at the center of said outlet along the flow of fuel.

* * * * *